United States Patent
Yang

(10) Patent No.: US 7,480,961 B2
(45) Date of Patent: Jan. 27, 2009

(54) MINIATURE HINGE

(75) Inventor: Shun-Pin Yang, Tu-Cheng (TW)

(73) Assignee: Chen Uei Precision Industry Co., Ltd., Taipei Hsien (TW)

( * ) Notice: Subject to any disclaimer, the term of this patent is extended or adjusted under 35 U.S.C. 154(b) by 456 days.

(21) Appl. No.: 11/409,961

(22) Filed: Apr. 25, 2006

(65) Prior Publication Data

US 2007/0245523 A1   Oct. 25, 2007

(51) Int. Cl.
*E05D 1/02* (2006.01)

(52) U.S. Cl. .................................. 16/303; 16/330

(58) Field of Classification Search ........... 16/337–339, 16/342, 330, 303, 374, 376, 377, 340; 361/680–683, 361/814; 455/90.3, 575.1, 575.3, 575.8; 379/433.12, 433.13; 348/373, 333.01, 333.06, 348/794

See application file for complete search history.

(56) References Cited

U.S. PATENT DOCUMENTS

| | | | |
|---|---|---|---|
| 6,766,180 B2 * | 7/2004 | Doraiswamy et al. .... | 455/575.1 |
| 6,920,668 B2 * | 7/2005 | Hayashi ....................... | 16/303 |
| 7,383,616 B2 * | 6/2008 | Duan et al. .................... | 16/303 |
| 2005/0138771 A1 * | 6/2005 | Su ................................ | 16/330 |
| 2005/0138772 A1 * | 6/2005 | Park ............................. | 16/330 |
| 2005/0188502 A1 * | 9/2005 | Duan et al. ................... | 16/303 |

FOREIGN PATENT DOCUMENTS

| | | | |
|---|---|---|---|
| JP | 2004176780 A | * | 6/2004 |
| KR | 2005028237 A | * | 3/2005 |

* cited by examiner

*Primary Examiner*—Chuck Y. Mah
(74) *Attorney, Agent, or Firm*—Birch, Stewart, Kolasch & Birch, LLP

(57) ABSTRACT

A miniature hinge includes a hinge housing, a first cam having a shaft portion, and a plurality of first can protrusions provided with facing cam surfaces defining a valley-shaped portion and an aperture passing through the first cam, a second cam having a plurality of second cam portions with a plurality of opposite circumferential curved surfaces, a perforation passing through the second cam and a plurality of grooves formed on front end of the perforation to form an end hole, an elastic element received in the hinge housing and a hinge shaft having an axle, a circular board formed and a positioning seat. The positioning seat of the hinge shaft passes through the hinge housing, the elastic element, the first cam and the second cam. The hinge shaft is rotated in an angle in order to insert the positioning seat into the end hole of the second cam.

5 Claims, 5 Drawing Sheets

(Proir Art)

MINIATURE HINGE

BACKGROUND OF THE INVENTION

1. Field of the Invention

The present invention generally relates to a miniature hinge, and more particular to the miniature hinge for being used in the flip type or folder type phone.

2. The Related Art

Portable devices, such as the notebook, cellular phone, hand-held phone, and personal communication service phone, are widely used. Generally, the portable device has a flip cover, a base body and a miniature hinge adapted to mechanically couple the flip cover and the base body.

A conventional hinge 200, as shown in FIG. 7, includes a hinge cover 11, a hinge shaft 12, a spring 13, a first cam 14a, a second cam 14b and an E-clip 15. A circular hole is formed through one end wall of the hinge cover 11 in order to allow the hinge shaft 12 to pass through. The first cam 14a has a pair of mountain-shaped portion extending forwardly along the rotating axis direction. The second cam 14b has a pair of mountain-shaped portion defining a valley-shaped portion therebetween. A circular groove 12a is formed at one end of the hinge shaft 12 for engaging with the E-clip 15.

When assembling the hinge 200, firstly, the spring 13 is placed in the hinge cover 11, and then, the hinge shaft 12 sequentially passes through the first cam 14a, the second cam 14b and the spring 13. The first cam 14a and the second cam 14b have the similar shape as the inner shape of the hinge cover 11, so that they are assembled together in the rotating axis direction. At last, the E-clip 15 is engaged with the groove 12a of the hinge shaft 12.

After the hinge 200 is assembled in the portable device, the mountain-shaped portion of the first cam 14a is biased against the valley-shaped portion of the second cam 14b, so that the flip cover of the portable device rotates in accordance with the rotation of the hinge 200 to open and close the portable device.

In the assembling process, the inner diameter of the E-clip 15 is smaller than the diameter of the hinge shaft 12, so that a larger force is needed in order to insert E-clip 15 into the groove 12a for securing the hinge shaft 12. Furthermore, when the hinge 200 is used for many times, the E-clip 15 is easy to be damaged. Thereby, the E-clip 15 would fall out from the groove 12a.

SUMMARY OF THE INVENTION

An object of the present invention is to provide a miniature hinge which includes a hinge housing, a first cam, a second cam, an elastic element and a hinge shaft. The hinge housing has a circular wall to form a hollow space. The circular wall has an end wall at one end, an opening at the other end and a circular hole formed at the end wall. The first cam has a shaft portion, a plurality of first cam portions provided with facing cam surfaces forming a plurality of valley-shaped portion and an aperture passing through the first cam. The second cam has a plurality of second cam portions with a plurality of circumferential curved surfaces, a fixing portion extending forward from the second cam portions, a perforation having a plurality of lateral walls and passing through the second cam, a plurality of grooves formed in the lateral walls of the perforation and having a bottom surface formed at the rear end of the groove. The grooves form an end hole. The elastic element is received in the hinge housing. The hinge shaft has an axle, a circular board formed at one end of the axle and a positioning seat extending from the other end of the axle. The positioning seat is a rectangular-shaped board having a plurality of laterals and a rear surface. The hinge shaft sequentially passes through the hinge housing, the first cam, the second cam and the elastic element. The laterals of the positioning seat slides into the perforation, furthermore, the hinge shaft is rotated in an angle and seated in the end hole and the rear surface of the positioning seat abuts against the bottom surfaces of the grooves.

It can be seen that the facing cam surfaces of the first cam portions abut against the circumferential curved surfaces of the second cam portions to engage the first cam. Since the positioning seat of the hinge shaft is engaged in the grooves of the second cam by the elasticity of the spring, the second cam would not be separated from the first cam.

Other objects, novel features and advantages of the present invention will become more apparent from the following detailed description of a preferred embodiment thereof when taken in conjunction with the accompanying drawings.

DETAILED DESCRIPTION OF THE PREFERRED EMBODIMENT

In order to illustrate the present invention particularly, including technology, structure traits, aims and efficiency, a detailed explanation of a preferred embodiment of the present invention will be given thereinafter, with reference to the annexed drawings, for better understanding thereof to those skilled in the art.

Figure 1:
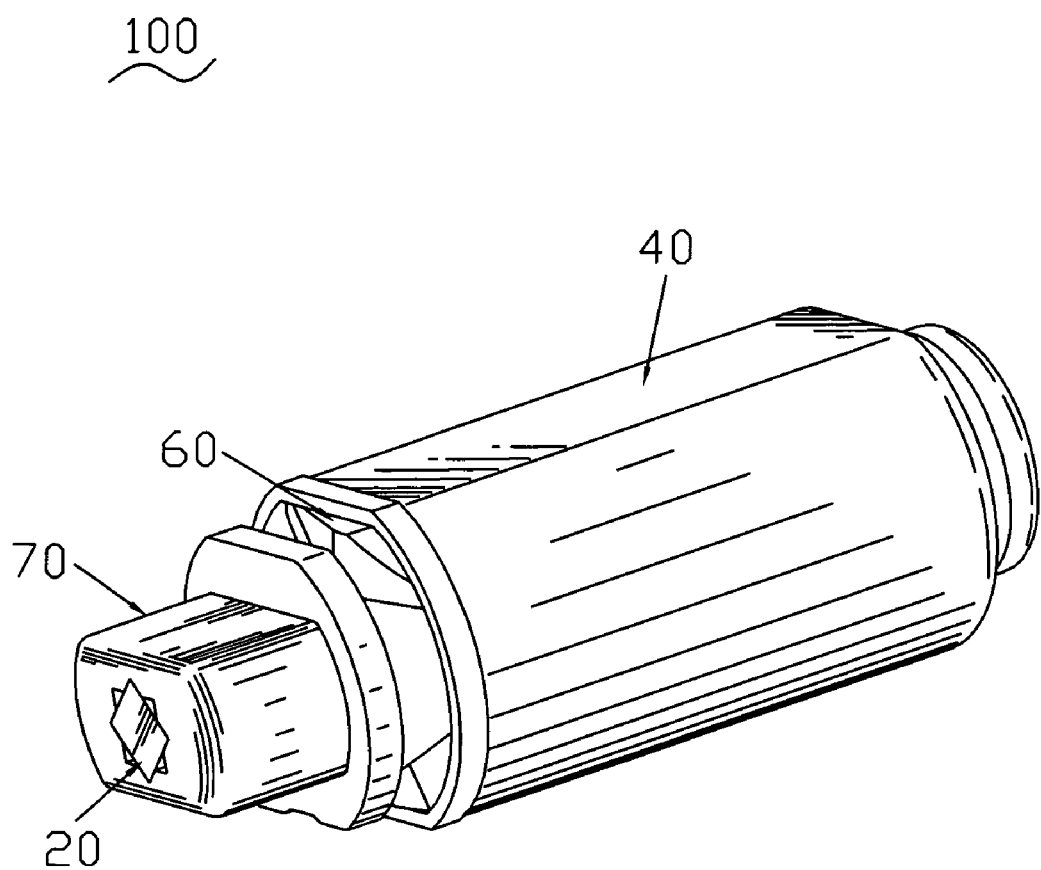
FIG. 1 is a perspective view of a miniature hinge in accordance with the present invention.
Figure 2:
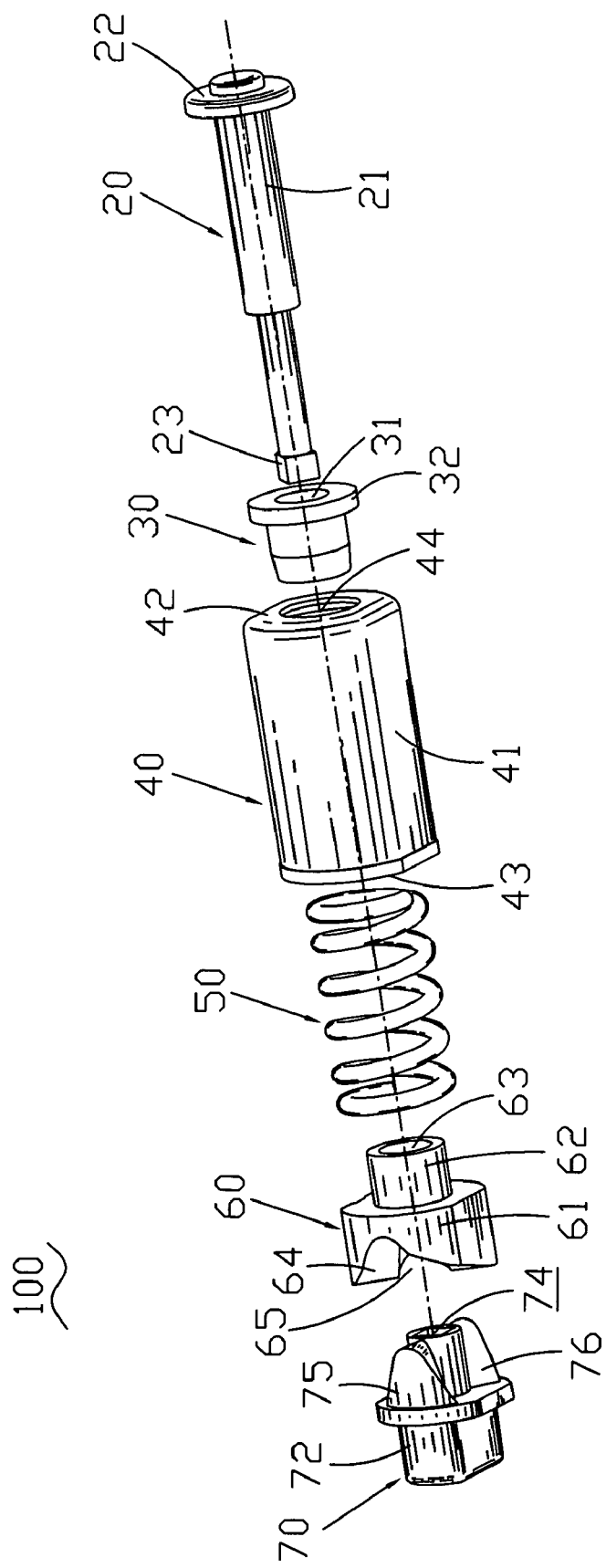
FIG. 2 is an exploded perspective view of the miniature hinge.

Please refer to FIGS. 1 and 2, the miniature hinge 100 of the present invention includes a hinge shaft 20, a pad 30, a hinge housing 40, an elastic element 50, a first cam 60 and a second cam 70 engaging with the first cam 60. For example, the elastic element 50 is a hinge spring. The hinge shaft 20 sequentially passes through the hinge spring 50, the first cam 60 and the second cam 70 in the direction of a rotating axis and assembled in the hinge housing 40.

Figure 3:
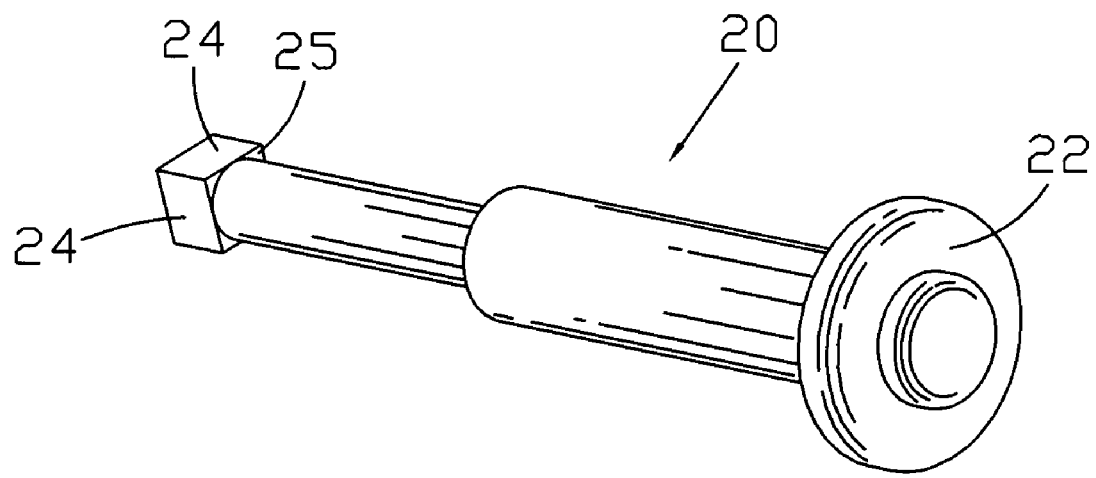
FIG. 3 is a perspective view of a hinge shaft of the miniature hinge.

Referring now to FIG. 2, the configuration of the miniature hinge 100 will be described in detail. The hinge shaft 20 has an axle 21, a circular board 22 formed at one end of the axle 21 and a positioning seat 23 extending from the other end of the axle 21. Please further refer to FIG. 3. The positioning seat 23 is a rectangular-shaped board having four laterals 24 and a rear surface 25.

The pad 30 has a through hole 31 passing through the pad 30 and a fringe board 32 formed at the rear end of the pad 30. The through hole 31 allows the positioning seat 23 to pass through the pad 30. When the positioning seat 23 of the hinge shaft 20 passes through the through hole 31, the fringe board 32 of the pad 30 is located and abutted against the circular board 22 of the hinge shaft 20.

The hinge housing 40 comprises a circular wall 41 to form a hollow space. The circular wall 41 has an end wall 42 at one end and an opening 43 at the other end. A circular hole 44 is formed at the end wall 42 to allow the positioning seat 23 to pass through. The circular hole 44 receives the pad 30 with the fringe board 32 of the pad 30 located between the end wall 42 of the hinge housing 40 and the circular board 22 of the hinge shaft 20.

The hinge spring 50 is received in the circular wall 41 of the hinge housing 40 and allows the hinge shaft 20 to be inserted therein. One end of the hinge spring 50 receives the front end of the pad 30.

The first cam 60 has a shaft portion 62 inserting into the other end of the hinge spring 50 and a pair of first cam portions 61 formed at the front end of the shaft portion 62. For the preferred embodiment, the first cam portion 61 is a mountain-shaped portion. Each first cam portion 61 is provided with a facing cam surface 64. At least a valley-shaped portion 65 is formed between the first cam portions 61. An aperture 63 is formed and passed through the first cam 60. The diameter of the aperture 63 is the same as the diameter of the axel 21 so that the hinge shaft 20 passes through the aperture 63.

Figure 4:
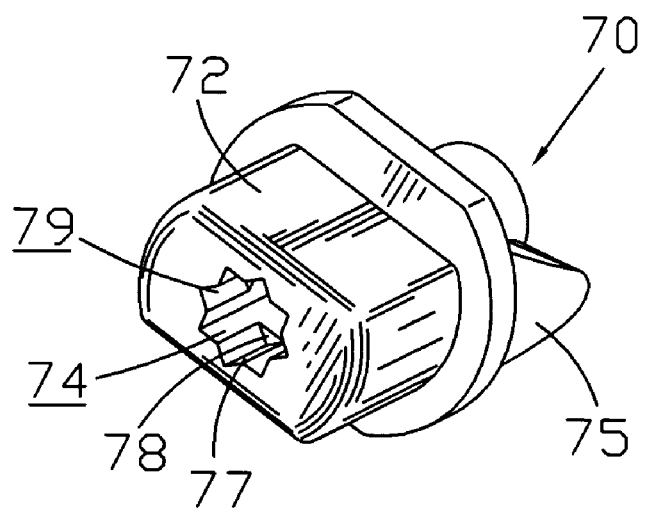
FIG. 4 is a perspective view of a second cam of the miniature hinge.

The second cam 70 has a pair of second cam portions 75 which are provided with a pair of opposite circumferential curved surfaces 76, a fixing portion 72 extending forwardly from the second cam portions 75 and a perforation 74 passing through the second cam 70. For the preferred embodiment, each second cam portion 75 is a mountain-shaped portion. Please further refer to FIG. 4, the perforation 74 has a shape which is the same as the shape of the positioning seat 23. For example, the perforation 74 is a rectangular perforation. That is, the perforation 74 has four lateral walls. Each lateral wall of the perforation 74 has a groove 77. There are four grooves 77 formed in the lateral walls of the perforation 74 to form an end hole 79. The end hole 79 has the same shape as the perforation 74. As can be seen in FIG. 4, the perforation 74 and the end hole 79 form an octagon hole at front end of the second cam 70. Further, the length of the groove 77 is similar to that of the positioning seat 23 and has a bottom surface 78 formed at the rear end of the groove 77. Therefore, the positioning seat 23 is seated in the end hole 79 and the rear surface 25 of the positioning seat 23 abuts against the bottom surfaces 78 of the grooves 77.

Figure 5:
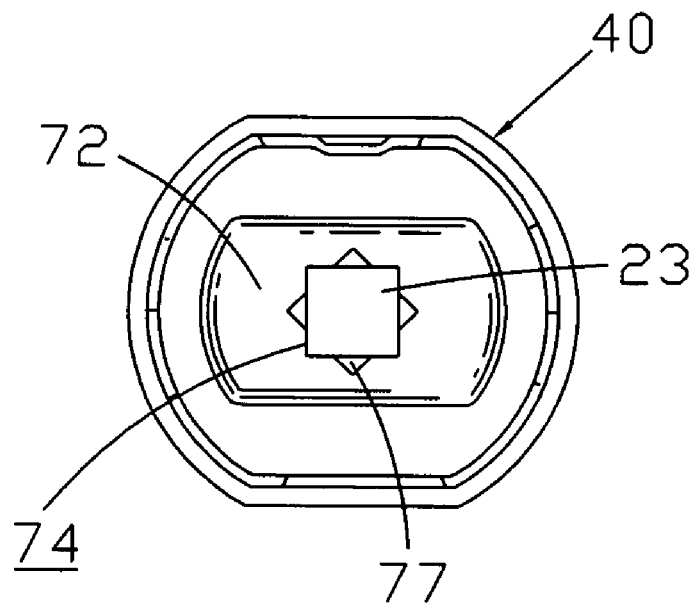
FIG. 5 is a front view of the miniature hinge showing a positioning seat sliding into a perforation.
Figure 6:
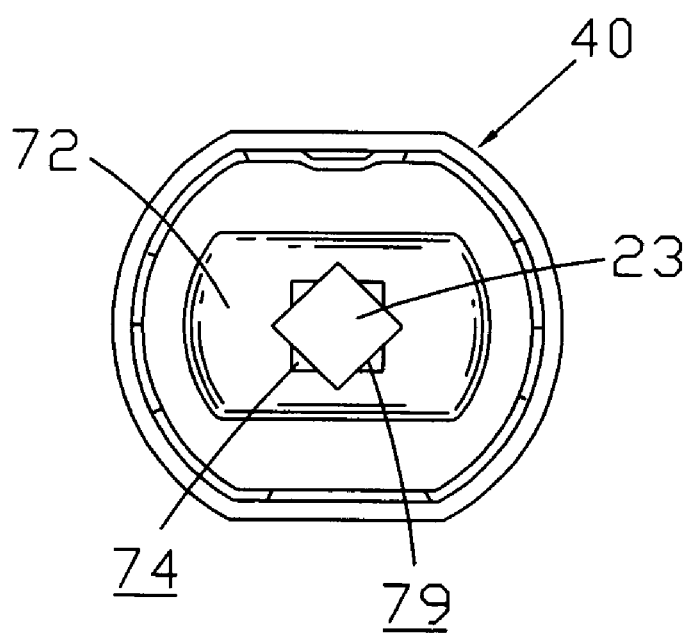
FIG. 6 is a front view of the miniature hinge showing the hinge shaft rotating at 45 degree and then seating in a groove.
Figure 7:
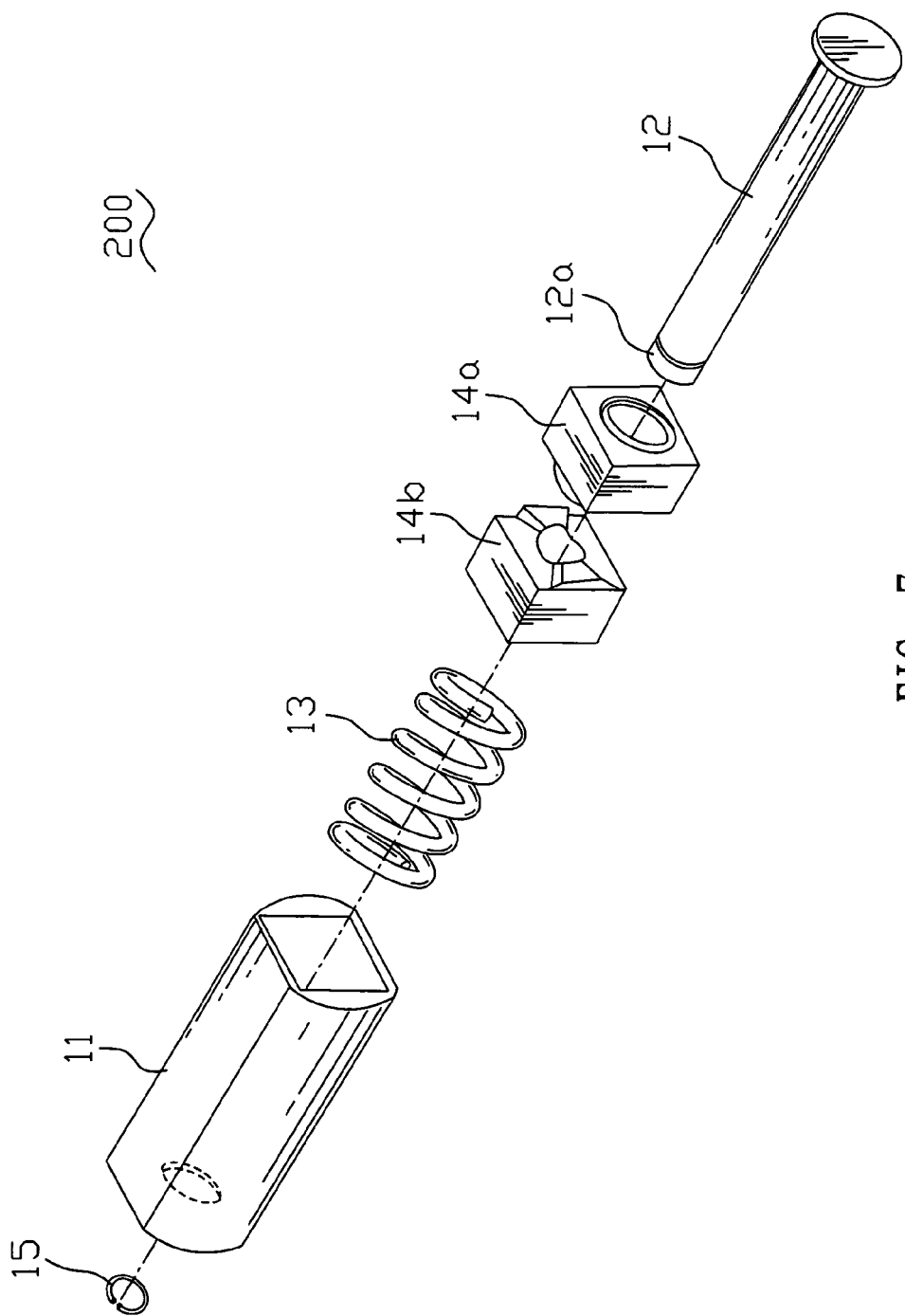
FIG. 7 is an exploded view of a conventional miniature hinge.

The assembly of the miniature hinge 100 will now be described with reference to FIG. 2. Firstly, the hinge spring 50 is received in the hinge housing 40, then, the positioning seat 23 of the hinge shaft 20 is passed through the through hole 31 of the pad 30 and the pad 30 is attached to the circular board 22. The hinge shaft 20 is passed through the hinge housing 40 via the circular hole 44. The hinge shaft 20 is sequentially passed through the hinge spring 50, the aperture 63 of the first cam 60 and the perforation 74 of the second cam 70. The four laterals 24 of the positioning seat 23 slide into the perforation 74 of the second cam 70. The shaft portion 62 of the first cam 60 is inserted into the hinge spring 50. The facing cam surfaces 64 of the first cam portions 61 abut against the circumferential curved surfaces 76 of the second cam portions 75 to engage the first cam 60 with the second cam 70, so that the first cam 60 compresses the spring 50 to produce an elasticity. Please refer to FIG. 5 and FIG. 6. The positioning seat 23 of the hinge shaft 20 protrudes out of the perforation 74 by a pushing force, and then the hinge shaft 20 is rotated in a rotating axis at 45 degree. Releasing the pushing force, the positioning seat 23 is seated in the grooves 77 by the elasticity of the hinge spring 50. The rear surface 25 abuts against the bottom surface 78. Therefore, the positioning seat 23 is engaged with the second cam 70.

When the miniature hinge 100 is assembled in the mobile phone, the facing cam surfaces 64 of the first can portions 61 abut against the circumferential curved surfaces 76 of the second cam portions 75 to engage the first cam 60 with the second cam 70. The first cam 60 can be rotated in a certain angle relative to the second cam 70. Since the positioning seat 23 of the hinge shaft 20 is seated in the groove 77 by the elasticity of the hinge spring 50, the second cam 70 would not be separated from the first cam 60.

Although a preferred embodiment of the present invention has been described in detail hereinabove, it should be clearly understood that many variations and/or modifications of the basic inventive concepts herein taught which may appear to those skilled in the present art will fall within the spirit and scope of the present invention, as defined in the appended claims.

What is claimed is:

1. A miniature hinge comprising:

a hinge housing having a circular wall to form a hollow space, the circular wall having an end wall at one end and an opening at another end, a circular hole being formed at the end wall;

a first cam having a shaft portion and a plurality of first cam portions formed at the front end of the shaft portion and an aperture passing through the first cam, each first cam portion being provided with facing cam surfaces, at least a valley-shaped portion formed between the facing cam surfaces;

a second cam having second cam portions which are provided with circumferential curved surfaces, a fixing portion extending forward from the second cam portions, a perforation having a plurality of lateral walls and passing through the second cam and grooves formed in the lateral walls of the perforation, the grooves forming an end hole and having a bottom surface formed at the rear end of the groove;

an elastic element received in the hinge housing; and a hinge shaft having an axle, a circular board formed at one end of the axle and a positioning seat extending from the other end of the axle, the positioning seat having a rear surface, wherein during assembling process, the hinge shaft sequentially passes through the hinge housing, the elastic element, the aperture of the first cam and the perforation of the second cam, further the positioning seat of the hinge shaft protruding out of the perforation, then, the hinge shaft is rotated in an angle and seated in the end hole and the rear surface of the positioning seat abuts against the bottom surfaces of the grooves.

2. The miniature hinge as claimed in claim 1, wherein the positioning seat, the perforation and the end hole have the same shape.

3. The miniature hinge as claimed in claim 2, further comprising a pad having a through hole passing through the pad and a fringe board formed at the rear end of the pad, the through hole allowing the hinge shaft to pass through and the fringe board abutting the circular board of the hinge shaft.

4. The miniature hinge as claimed in claim 1, further comprising a pad having a through hole passing through the pad and a fringe board formed at the rear end of the pad, the through hole allowing the hinge shaft passing through and the fringe board abutting the circular board of the hinge shaft.

5. The miniature hinge as claimed in claim 1, wherein said elastic element is a spring.

* * * * *